US012657834B2

(12) United States Patent
Lee et al.

(10) Patent No.: US 12,657,834 B2
(45) Date of Patent: Jun. 16, 2026

(54) DISPLAY APPARATUS FOR DISPLAYING AUGMENTED REALITY OBJECT AND CONTROL METHOD THEREOF

(71) Applicant: SAMSUNG ELECTRONICS CO., LTD., Suwon-si (KR)

(72) Inventors: Inhwan Lee, Suwon-si (KR); Kwanghyuk Kim, Suwon-si (KR); Daehyeon Jung, Suwon-si (KR); Youmin Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 230 days.

(21) Appl. No.: 18/205,220

(22) Filed: Jun. 2, 2023

(65) Prior Publication Data

US 2024/0037868 A1 Feb. 1, 2024

Related U.S. Application Data

(63) Continuation of application No. PCT/KR2023/005891, filed on Apr. 28, 2023.

(30) Foreign Application Priority Data

Jul. 29, 2022 (KR) ........................ 10-2022-0094969
Aug. 10, 2022 (KR) ........................ 10-2022-0099967

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01)

(58) Field of Classification Search
CPC ......... G06T 19/006; G06T 7/70; G06T 19/00; G06T 19/20; G06F 3/00; G06F 3/01
See application file for complete search history.

(56) References Cited

U.S. PATENT DOCUMENTS 8,315,432 B2 11/2012 Lefevre et al.
8,913,171 B2 * 12/2014 Roberts .............. H04N 21/4126
348/333.02

(Continued)

FOREIGN PATENT DOCUMENTS

JP 2016-045779 A 4/2016
KR 10-2013-0112578 A 10/2013

(Continued)

OTHER PUBLICATIONS

International Search Report (PCT/ISA/210) issued on Aug. 10, 2023 by the International Searching Authority in International Patent Application No. PCT/KR2023/005891.

(Continued)

*Primary Examiner* — Motilewa Good-Johnson
(74) *Attorney, Agent, or Firm* — Sughrue Mion, PLLC

(57) ABSTRACT

Provided is a display apparatus including a camera, a memory stored with information about an augmented reality (AR) object, a display, and at least one processor connected with the camera. The processor identifies at least one object from an image captured through the camera, identifies a target object from among the at least one object based on information about the AR object, and controls the display to display the AR object based on a position of the target object.

15 Claims, 17 Drawing Sheets

(56) References Cited

U.S. PATENT DOCUMENTS

| | | | | |
|---|---|---|---|---|
| 9,922,273 | B2 | 3/2018 | Lim | |
| 10,026,229 | B1 * | 7/2018 | Yalniz | G06T 7/74 |
| 10,115,236 | B2 | 10/2018 | Sharma et al. | |
| 10,242,456 | B2 * | 3/2019 | Weller | G06T 19/006 |
| 10,380,803 | B1 * | 8/2019 | Jaafar | G06T 19/006 |
| 10,522,115 | B2 | 12/2019 | Hwang et al. | |
| 11,373,340 | B2 | 6/2022 | Kim et al. | |
| 11,430,191 | B2 * | 8/2022 | Tan | G06T 7/0002 |
| 11,508,134 | B2 * | 11/2022 | Kawamae | G06V 10/147 |
| 11,587,265 | B2 * | 2/2023 | Cho | H04N 23/64 |
| 11,763,535 | B2 * | 9/2023 | Jeong | G06T 19/20 |
| | | | | 345/427 |
| 11,935,201 | B2 * | 3/2024 | Tan | G06F 3/167 |
| 2012/0146998 | A1 * | 6/2012 | Kim | G06T 7/248 |
| | | | | 345/419 |
| 2012/0327117 | A1 * | 12/2012 | Weller | G06T 19/006 |
| | | | | 345/633 |
| 2014/0292809 | A1 * | 10/2014 | Tsurumi | G06F 3/04812 |
| | | | | 345/633 |
| 2016/0182946 | A1 * | 6/2016 | Diefenbaugh | H04N 21/43637 |
| | | | | 345/2.3 |
| 2017/0201749 | A1 * | 7/2017 | Oishi | H04N 23/88 |
| 2019/0034765 | A1 * | 1/2019 | Kaehler | G02B 27/0172 |
| 2019/0102946 | A1 | 4/2019 | Spivack et al. | |
| 2019/0197781 | A1 * | 6/2019 | Patel | G06T 19/006 |
| 2019/0320104 | A1 * | 10/2019 | Eun | H04N 21/41265 |
| 2020/0037144 | A1 * | 1/2020 | Chen | H04L 41/22 |
| 2020/0074743 | A1 * | 3/2020 | Zheng | G01P 13/00 |
| 2020/0167970 | A1 | 5/2020 | Kim et al. | |
| 2020/0410770 | A1 | 12/2020 | Choi et al. | |
| 2022/0044482 | A1 | 2/2022 | Kawamae et al. | |
| 2022/0108536 | A1 * | 4/2022 | Jung | G06F 3/01 |
| 2023/0053841 | A1 * | 2/2023 | Yuasa | G01S 17/931 |
| 2023/0128740 | A1 | 4/2023 | Hong et al. | |
| 2023/0290087 | A1 * | 9/2023 | Yoon | H04N 23/64 |
| 2023/0410379 | A1 * | 12/2023 | Johnston | H04N 7/15 |
| 2024/0037868 | A1 * | 2/2024 | Lee | G06F 3/01 |

FOREIGN PATENT DOCUMENTS

| | | | |
|---|---|---|---|
| KR | 10-1328759 | B1 | 11/2013 |
| KR | 10-2015-0057424 | A | 5/2015 |
| KR | 10-1708455 | B1 | 2/2017 |
| KR | 10-2017-0027271 | A | 3/2017 |
| KR | 10-1945294 | B1 | 2/2019 |
| KR | 10-2020-0051937 | A | 5/2020 |
| KR | 10-2020-0061196 | A | 6/2020 |
| KR | 10-2204919 | B1 | 1/2021 |
| KR | 10-2021-0083016 | A | 7/2021 |
| KR | 10-2021-0083574 | A | 7/2021 |
| KR | 10-2022-0090301 | A | 6/2022 |
| WO | 2015/192117 | A1 | 12/2015 |
| WO | 2022-066423 | A1 | 3/2022 |

OTHER PUBLICATIONS

Written Opinion (PCT/ISA/237) issued on Aug. 10, 2023 by the International Searching Authority in International Patent Application No. PCT/KR2023/005891.

Communication issued on Oct. 19, 2023 by the Korean Intellectual Property Office in Korean Patent Application No. 10-2022-0099967.

Written Opinion (PCT/ISA/237) issued on Nov. 12, 2024 by the International Searching Authority in International Patent Application No. PCT/KR2023/005891.

Communication (PCT/ISA/224) dated Nov. 12, 2024, issued by International Searching Authority for International Application No. PCT/KR2023/005891.

Communication issued on Apr. 26, 2023 by the Korean Intellectual Property Office in Korean Patent Application No. 10-2022-0099967.

Communication dated Jun. 2, 2025, issued by the European Patent Office in European Application No. 23846750.0.

* cited by examiner

FIG. 1A
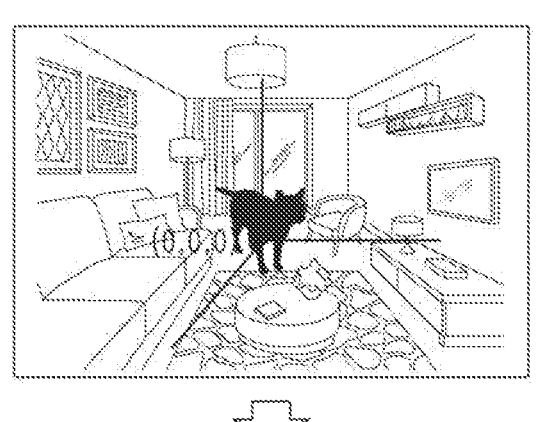
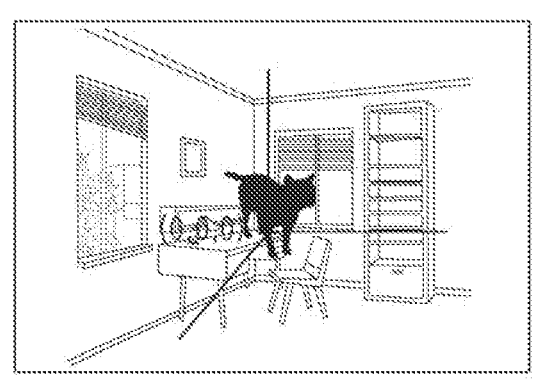
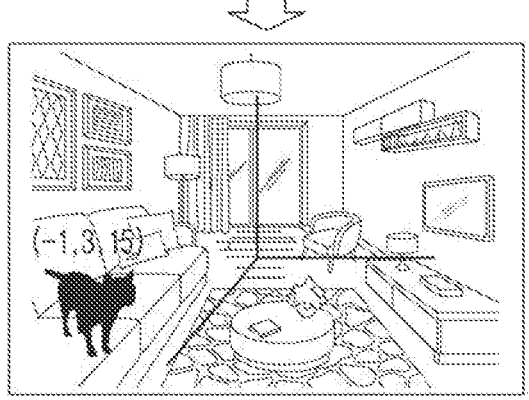
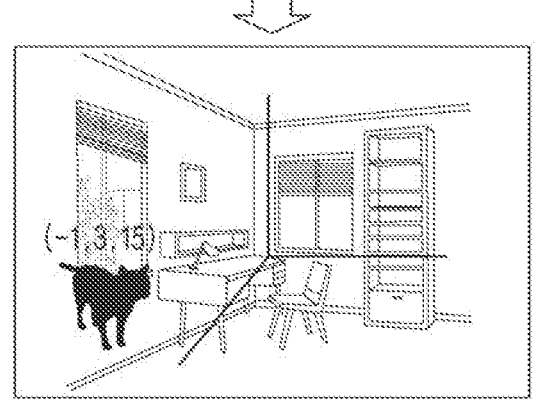
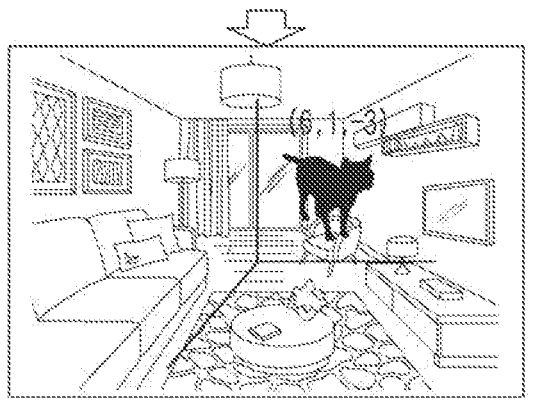
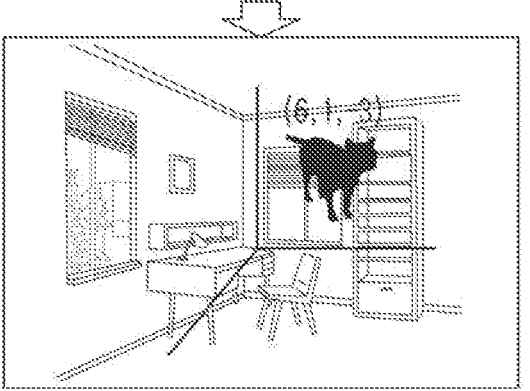

FIG. 11

```
                        Json Schema (400)

[
  {
    "frame" : number,
    "target" : object,
    "based_on" :                                              1110

[
      {
        "shape" : "("cube" | "sphere" | "capsule" | "cylinder" | "plane" | "quad" | ...)",
        "related_with" : "above" | "below" | "on" | "side" | "around" | "near" | ...)"
        "priority" : number
      }, "classification" : "("user" | "person" | "chair" | "desk" | tv" | "shelve" | "sofa" | "table" | ...)",
        "related_with" : "("above" | "below" | "side" | "around" | "near" | ...)"
        "priority" : number                                   1120

"capability" : "("sit" | "put_on" | "hide" | ...)",
        "related_with" : "("above" | "below" | "side" | "around" | "near" | ...)"
        "priority" : number                                   1130
      },
      ...
    ],
    "action" :
    {
      "action_type" : "("move" | "jump" | "walk" | "stand" | "idle" |..)",
      "loop" : boolean
    }
  },
  ...
]
```

FIG. 12

Frame: 1

```
[
    {
        "frame" : 1,
        "target" : "cat.glb",
        "based_on" :
        [
            {
                "classification" : "table",
                "related_with" : "on",
                "priority" : 10
            },
            {
                "shape" : "plane",
                "related_with" : "on",
                "priority" : 5
            },
        ],
        "action" :
        {
            "action_type" : "idle",
            "loop" : true
        }
    },
```

1210

1220

Frame: 20

```
{
    "frame" : 20,
    "target" : "cat.glb",
    "based_on" :
    [
        {
            "classification" : "sofa",
            "related_with" : "on",
            "priority" : 10
        },
        {
            "classification" : "chair",
            "related_with" : "on",
            "priority" : 9
        },
        {
            "shape" : "plane",
            "related_with" : "on",
            "priority" : 2
        },
    ],
    "action" :
    {
        "action_type" : "move",
        "loop" : false
    }
},
```

1230

Frame: 40

```
{
    "frame" : 40,
    "target" : "cat.glb",
    "based_on" :
    [
        {
            "classification" : "user",
            "related_with" : "near",
            "priority" : 10
        },
    ],
    "action" :
    {
        "action_type" : "walk",
        "loop" : true
    }
}
]
```

START

IDENTIFY AT LEAST ONE OBJECT FROM CAPTURED IMAGE ~S1610

IDENTIFY TARGET OBJECT FROM AMONG AT LEAST ONE OBJECT BASED ON INFORMATION ABOUT AR OBJECT, AND DISPLAY AR OBJECT BASED ON POSITION OF TARGET OBJECT ~S1620

END

DISPLAY APPARATUS FOR DISPLAYING AUGMENTED REALITY OBJECT AND CONTROL METHOD THEREOF

CROSS-REFERENCE TO RELATED APPLICATIONS

This application is a continuation of PCT/KR2023/005891, filed on Apr. 28, 2023, at the Korean Intellectual Property Receiving Office and claims priority under 35 U.S.C. § 119 to Korean Patent Application No. 10-2022-0094969, filed on Jul. 29, 2022 at the Korean Intellectual Property Office and Korean Patent Application No. 10-2022-0099967, filed on Aug. 10, 2022 at the Korean Intellectual Property Office, the disclosures of each which are incorporated by reference herein in their entireties.

BACKGROUND

1. Field

The disclosure relates to a display apparatus and a control method thereof, and more particularly, to a display apparatus that adaptively displays an augmented reality (AR) object according to a real environment and a control method thereof.

2. Description of Related Art

Due to advancements in electronic technology, electronic devices providing a variety of functions are being developed. For example, augmented reality devices that provide functions such as augmented reality (AR) and virtual reality (VR) are being developed.

Concepts such as eXtended Reality (XR) which encompass concepts of AR, VR, and mixed reality (MR) have been defined, and content of various forms according to an extended concept are being developed.

If content in which a real environment and a virtual environment are mixed, such as with AR and MR, there is a need to adaptively provide a virtual environment content according to various real environments.

In addition, AR devices may receive AR content from a display apparatus such as, for example, and without limitation, a television (TV), a digital signage, and the like, in a real environment, and display the received AR content in a vicinity of the display apparatus. A method by which the AR device can identify a position and orientation of the display apparatus is needed.

SUMMARY

According to an aspect of the disclosure, a display apparatus includes a camera; a memory configured to store information about an augmented reality (AR) object; a display; and at least one processor connected with the camera, the memory, and the display, the at least one processor being configured to control the display apparatus to: identify at least one object from an image captured through the camera, identify a target object from among the at least one object based on information about the AR object, and control the display to display the AR object based on a position of the target object.

The information about the AR object may include identification information about the target object and arrangement information showing an arranged state of the AR object with respect to the target object, and wherein the at least one processor may be further configured to: identify the target object from among the at least one object based on the identification information, and arrange the AR object with respect to the target object based on the arrangement information.

The identification information may include information about at least one from among a form or a color of the target object, and the arrangement information may include at least one from among a relative position of the AR object with respect to the target object or a displaying method of the AR object.

The at least one processor may be further configured to: obtain spatial information about the at least one object, and update the spatial information to include the AR object based on the position of the target object.

The at least one processor may be further configured to, based on the target object being re-identified after a lapse in identification of the target object from the captured image due to a change in an orientation of the display apparatus, control the display to display the AR object based on the position of the target object based on the updated spatial information.

The display apparatus may further include a communication interface, wherein the at least one processor may be further configured to: receive first information from an electronic device through the communication interface, obtain second information based on a screen of the at least one object, and based on the first information and the second information matching, identify the electronic device as other display apparatus, wherein the first information may include information quantizing a screen being displayed by the electronic device and time information at which the screen is displayed, and wherein the second information may include information quantizing the screen of the at least one object and time information at which the screen is captured.

The at least one processor may be further configured to: based on the other display apparatus being identified, identify a content being displayed by the other display apparatus, identify the AR object based on the identified content, and control the display to display the identified AR object based on a position of the other display apparatus.

The at least one processor may be further configured to: identify at least one from among the position or orientation of the other display apparatus, and control the display to display the AR object based on at least one from among the position or the orientation of the other display apparatus.

The information about the AR object may include information about at least one from among a form, a position, or a size of the AR object for each frame, and wherein the at least one processor may be further configured to control the display to display the AR object for each frame differently based on the information about the AR object.

The information about the AR object may include first object information about the AR object from a first frame and second object information about the AR object from a second frame spaced apart from the first frame by a pre-set frame, and wherein the at least one processor may be further configured to: interpolate the AR object during a frame between the first frame and the second frame based on the first object information and the second object information, and control the display to display the interpolated AR object.

The display apparatus may further include a communication interface, wherein the at least one processor may be further configured to: receive the information about the AR object from a server through the communication interface, and store the received information about the AR object in the memory.

The at least one processor may be further configured to: control the communication interface to transmit information about the at least one object to the server, and receive information about the AR object corresponding to the at least one object from the server through the communication interface.

According to an aspect of the disclosure, a control method of a display apparatus includes identifying at least one object from a captured image; and identifying a target object from among the at least one object based on information about an augmented reality (AR) object, and displaying the AR object based on a position of the target object.

The information about the AR object may include identification information about the target object and arrangement information showing an arranged state of the AR object with respect to the target object, and wherein the displaying the AR object may include identifying the target object from among the at least one object based on the identification information, and arranging the AR object with respect to the target object based on the arrangement information.

The identification information may include information about at least one from among a form or color of the target object, and wherein the arrangement information may include at least one from among a relative position of the AR object or a displaying method of the AR object with respect to the target object.

According to an aspect of the disclosure, a display apparatus includes: a memory configured to store instructions; at least one processor configured to execute the stored instructions to: identify at least one object from an image captured through a camera, identify a target object from among the at least one object based on information about an augmented reality (AR) object, wherein the information about the AR object may include identification information about the target object and arrangement information showing an arranged state of the AR object with respect to the target object, and control a display to display the AR object based on a position of the target object.

The at least one processor may be further configured to arrange the AR object with respect to the target object based on the arrangement information.

The identification information may include information about at least one from among a form or a color of the target object, and the arrangement information may include at least one from among a relative position of the AR object with respect to the target object or a displaying method of the AR object.

The at least one processor may be further configured to: obtain spatial information about the at least one object, and update the spatial information to include the AR object based on the position of the target object.

The at least one processor may be further configured to, based on the target object being re-identified after a lapse in identification of the target object from the captured image due to a change in an orientation of the display apparatus, control the display to display the AR object based on position of the target object based on the updated spatial information.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1A and FIG. 1B are diagrams illustrating a problem of an augmented reality (AR) device;

FIG. 11 and FIG. 12 are diagrams illustrating a specification method for each frame, according to one or more embodiments;

DETAILED DESCRIPTION

Provided is a display apparatus that adaptively displays an augmented reality (AR) object according to a real environment, and identifies a television (TV), and the like, in a real environment without inconveniencing a user, and a control method thereof.

The example embodiments of the disclosure will be described in detail below with reference to the accompanying drawings.

The terms used in describing the various embodiments of the disclosure are general terms selected that are currently widely used considering their function herein. However, the terms may change depending on intention, legal or technical interpretation, emergence of new technologies, and the like of those skilled in the related art. In addition, in some cases, there may be terms arbitrarily selected, and the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

A singular expression includes a plural expression, unless otherwise specified. It is to be understood that the terms such as "consist" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using an electronic device or a device (e.g., artificial intelligence electronic device) using an electronic device.

Various embodiments of the disclosure will be described in greater detail below with reference to the accompanied drawings.

Figure 1B:
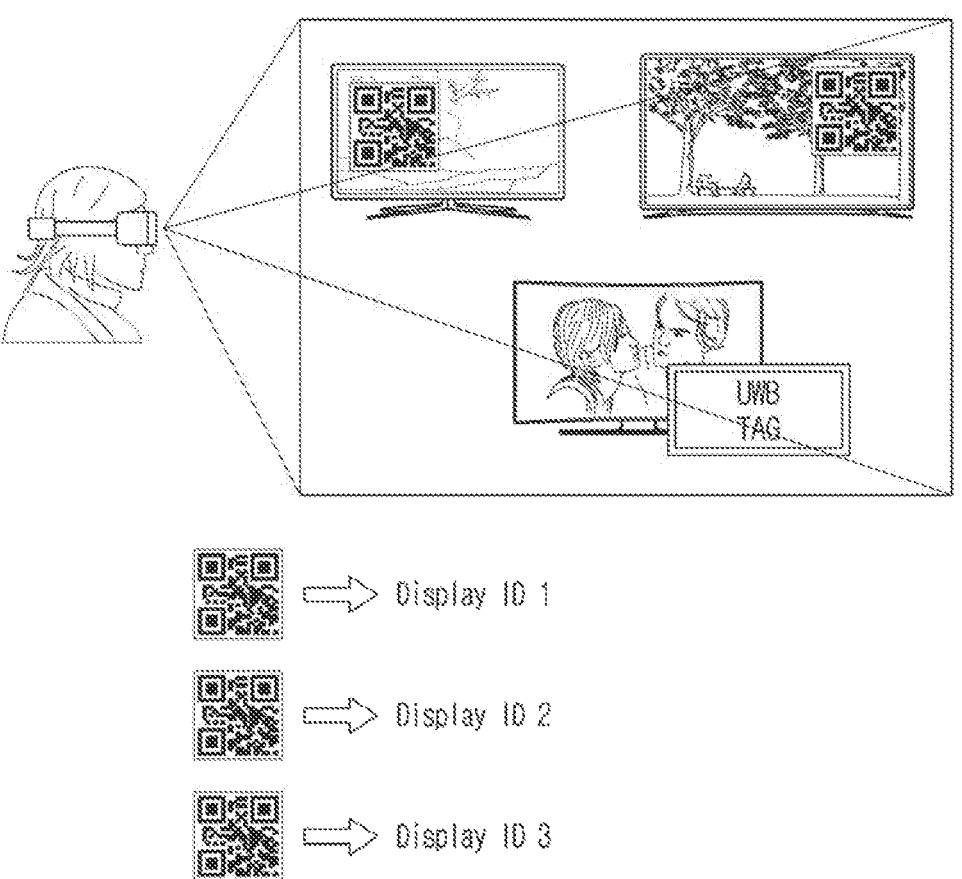

FIG. 1A and FIG. 1B are diagrams illustrating a problem of an augmented reality (AR) device.

An AR content included in an animation either moved according to a constant coordinate value based on a random center coordinate within a timeline, or moved through a calculated coordinate according to a predetermined formula. For example, as shown in a left side of FIG. 1A, an AR object in cat form may move from coordinates of (0,0,0) to (6,1,−3) via (−1,3,15) as time passes. The cat may move from a living room to a chair via a sofa.

However, a problem may occur if an environment is changed while using the same coordinate. For example, if the AR object of the cat form moves from coordinates of (0,0,0) to (6,1,−3) via (−1,3,15), a position of the cat in an environment as in a right side of FIG. 1A may not coincide with the real environment. That is, if the AR content is generated simply based on the center coordinate, it may interrupt an immersion in user content according a change in environment, and a limit to content that can be provided by a content generator may occur.

Alternatively, a space may be scanned in advance and an AR content matched to the space may be played back, but there is a limitation of having to use the AR content at only the scanned space despite a user immersion being enhanced.

An AR device may operate interlinked with the display apparatus. For example, the AR device may identify a display apparatus through a method of using a camera or a method of using wireless signals such as, for example, and without limitation, an Ultra WideBand (UWB), WIFI, Bluetooth, and the like, and operate interlinked with the display apparatus.

A method of using the camera may be a method of identifying the display apparatus by recognizing an object through an image analysis, or identifying a specific pattern such as a QR code displayed in a screen of the display apparatus. Alternatively, the position and size of the display apparatus recognized by the camera may be manually designated by a user of the AR device. However the method of recognizing an object through an image analysis has a problem of a false recognition rate being high, requiring a machine-learning hardware for recognition, and distinguishing each display being difficult when there are a plurality of display apparatuses. The method of using a specific pattern such as a QR code has a problem of interrupting a viewing by the user according to a pattern being displayed as shown in FIG. 1B. The manual method in itself causes user inconvenience, and in case of an AR device with no specific input device such as a touch screen, there is a difficulty in precisely designating an area of the display apparatus.

A service discovery using a wireless communication network protocol such as WIFI or Bluetooth may be a representative example of the method off connecting the AR device with the display apparatus using a wireless signal. The display apparatuses may become clients, respectively, and register in a service registry in a network, the AR device may become a server and request data by selecting a desired client from among the display apparatuses, and may be referred to as a server-side discovery. The AR device may continue tracking the position and orientation of the display apparatus after discovering the display apparatus to connect to. The UWB may provide positions and distances with a counterpart devices from a short range, and a Wi-Fi location technology may also be used for a similar purpose as the UWB. Alternatively, if an object is recognized using the camera, a position, a direction, a distance, and the like may be identified from an object recognition result and a form of the display apparatus.

However, with the UWB, there is a problem of both a transmitter and a receiver requiring separate hardware, and not knowing the direction of the display apparatus. The Wi-Fi location technology also has a problem of being usable only when there are a plurality of access point devices that support a function. A method using other wireless communication network protocols has a problem of merely providing a connection means between the devices, and not providing the position and direction of the display apparatus.

Figure 2:
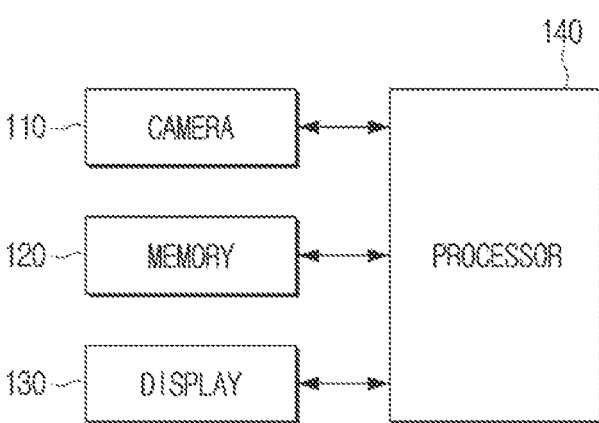
FIG. 2 is a block diagram illustrating a configuration of a display apparatus, according to one or more embodiments.

FIG. 2 is a block diagram illustrating a configuration of a display apparatus 100 according to one or more embodiments.

The display apparatus 100 may be a device that displays an AR object, and may be an AR glass, a smartphone, a tablet, a TV, a desktop personal computer (PC), a monitor, a notebook, a video wall, a large format display (LFD), a digital signage, a digital information display (DID), a projector display, a digital video disk (DVD) player, a smart watch, and the like, and may be any device so long as it is a device that can display the AR object.

Alternatively, the display apparatus 100 may include a camera, and may be a device that displays by overlaying the AR object to an image captured through the camera. Alternatively, the display apparatus 100 may include a transparent display, and may be a device that displays the AR object to the transparent display. The user may view a scene overlaid with the AR object in the real environment.

Referring to FIG. 2, the display apparatus 100 may include a camera 110, a memory 120, a display 130, and a processor 140, according to an embodiment.

The camera 110 may be a configuration for capturing a still image or a moving image. The camera 110 may capture a still image from a specific time point, but may also capture a still image consecutively.

The camera 110 may capture a front direction of the display apparatus 100 and capture the real environment of the front direction of the display apparatus 100. The processor 140 may identify at least one object from the image captured through the camera 110.

The camera 110 may include a lens, a shutter, an aperture, solid-state imaging device, an Analog Front End (AFE), and a Timing Generator (TG). The shutter may be configured to adjust a time during which light reflected from a subject enters the camera 110, and the aperture may be configured to adjust an amount of light incident to the lens by mechanically increasing or decreasing a size of an opening part through which light enters. The solid-state imaging device may be configured to output, based on light reflected from the subject being accumulated as photo charge, an image by the photo charge as an electric signal. The TG may be configured to output a timing signal for reading out pixel data of the solid-state imaging device, and the AFE may be configured to digitalize the electric signal output from the solid-state imaging device by sampling.

The memory 120 may refer to a hardware that stores information such as data in electric or magnetic form for the processor 140 and the like to access. To this end, the memory 120 may be implemented as at least one hardware from among a non-volatile memory, a volatile memory, a flash memory, a hard disk drive (HDD) or a solid state drive (SSD), a random access memory (RAM), a read only memory (ROM), and the like.

In the memory 120, at least one instruction necessary in an operation of the display apparatus 100 or the processor 140 may be stored. The instruction may be a code unit that instructs an operation of the display apparatus 100 or the processor 140, and may be prepared in a machine language which is a language that can be understood by a computer. Alternatively, the memory 120 may be stored with a plurality of instructions that perform a specific work of the display apparatus 100 or the processor 140 as an instruction set.

The memory 120 may be stored with data which is information in a bit or byte unit that can represent a character, a number, an image, and the like. For example, the memory 120 may store information about the AR object, and the like.

The memory 120 may be accessed by the processor 140 and reading, writing, modifying, deleting, updating, and the like of the instruction, the instruction set, or data may be performed by the processor 140.

The display 130 may be a configuration that displays an image, and implemented as a display of various forms such as a liquid crystal display (LCD), an organic light emitting diode (OLED) display, and a plasma display panel (PDP). In the display 130, a driving circuit, which may be implemented in the form of an a-si TFT, a low temperature poly silicon (LTPS) TFT, an organic TFT (OTFT), or the like, a backlight unit, and the like may be included. The display 130 may be implemented as a touch screen coupled with a touch sensor, a flexible display, a three-dimensional display (3D display), or the like.

The processor 140 may control the overall operation of the display apparatus 100. Specifically, the processor 140 may control the overall operation of the display apparatus 100 by being connected with each configuration of the display apparatus 100. For example, the processor 140 may be connected with configurations such as the camera 110, the memory 120, the display 130, and a communication interface and control an operation of the display apparatus 100.

According to one or more embodiments, the processor 140 may be implemented as a digital signal processor (DSP), a microprocessor, or a time controller (TCON). However, the embodiment is not limited thereto, and may include one or more items from among a central processing unit (CPU), a micro controller unit (MCU), a micro processing unit (MPU), a controller, an application processor (AP), a communication processor (CP), or an ARM processor, or may be defined by the corresponding term. In addition, the processor 140 may be implemented as a System on Chip (SoC) or a large scale integration (LSI) embedded with a processing algorithm, and may be implemented in the form of a field programmable gate array (FPGA).

The processor 140 may be implemented as one processor or as a plurality of processors. However, for convenience of description below, an operation of the display apparatus 100 will be described using the expression processor 140.

The processor 140 may identify at least one object from the image captured through the camera 110. For example, the processor 140 may identify a TV, a sofa, a window, a frame, a floor, and the like from the image captured through the camera 110. For example, the processor 140 may identify at least one object from an image captured through an artificial intelligence model. Alternatively, the processor 140 may identify a device such as a TV through wireless communication.

The processor 140 may identify at least one from among the position or the orientation of the at least one object. For example, the camera 110 may include a depth camera, and the processor 140 may identify a distance with the at least one object through the depth camera.

The processor 140 may identify a target object from among the at least one object based on information about the AR object, and control the display 130 to display the AR object based on the position of the target object.

The information about the AR object may include identification information of the target object and arrangement information showing an arranged state of the AR object with respect to the target object, and the processor 140 may identify the target object from among the at least one object based on the identification information, and arrange the AR object with respect to the target object based on the arrangement information.

For example, the information about the AR object may include a "sofa" as the target object, and an "upper end adjacent to the target object" as the arranged state of the AR object with respect to the target object. The processor 140 may identify the sofa as the target object, and display the AR object to be adjacent over the sofa. The sofa may be a conceptual meaning rather than referring to a sofa of a specific form or a specific brand. That is, the object identified as the sofa by the processor 140 may vary, and the processor 140 may control the display 130 to display the AR object over the sofa when it is identified as the sofa even if the real environment is changed and the form, size, and the like of the sofa is changed. Through the operation described above, the processor 140 may control the display 130 to adaptively display the AR object in the real environment.

Alternatively, the identification information may include information about at least one from among a form or color of the target object, and the arrangement information may include at least one from among a relative position of the AR object with respect to the target object or an AR object displaying method.

For example, the identification information may be represented as a flat plane surface, a curved surface, an edge, and the like. Alternatively, the identification information may be represented as a white color, a black color, and the like. Alternatively, the identification information may be represented as a flat black plane. The arrangement information may be represented over the target object with a transparency of 50%. However, the embodiment is not limited thereto, and the identification information and the arrangement information may be represented through various methods. Specifically, the identification information may be represented as a semantic specification which describes or means the target object rather than a word referring to the target object itself.

The processor 140 may control, based on a plurality of target objects being identified, the display 130 to display the AR object based on a size of the plurality of target objects. For example, the processor 140 may control, based on two sofas being identified, the display 130 to display the AR object over a large sofa from among the two sofas.

However, the embodiment is not limited thereto, and the processor 140 may control, based on the plurality of target objects being identified, the display 130 to display the AR object to each of the target objects. Alternatively, the information about the AR object may include an operation of when the plurality of target objects have been identified. For example, the information about the AR object may include, based on the plurality of target objects being identified, information for determining the target object close to the display apparatus 100 as a basis for the AR object to be displayed.

The processor 140 may obtain spatial information including information about at least one object, and update the spatial information to include an AR object based on a position of the target object.

For example, the processor 140 may obtain spatial information of a sofa being positioned at position (0,0,0), and update the spatial information such that the AR object is positioned at position (0,0,3).

The processor 140 may control, based on the target object being re-identified after not being able to identify the target object from the captured image because an orientation of the display apparatus 100 is changed, the display 130 to display the AR object based on the position of the target object based on the updated spatial information.

In the above-described example, if the display apparatus 100 is an AR glass, and the user turns his or her head such that the sofa is not visible from a line of vision of the user, and then the user turns his or her head again such that the sofa is visible again from the line of vision of the user, the processor 140 may control the display 130 to display the AR object over the sofa based on the updated spatial information. That is, the processor 140 may display the AR object based on the updated spatial information, after identifying the target object one time and then arranging the AR object, and identifying the target object again without performing an operation of arranging the AR object. Accordingly, the processor 140 may not repeat the operation of identifying the target object every time the image is changed.

The display apparatus 100 may further include a communication interface, and the processor 140 may receive first information from an electronic device through the communication interface, obtain second information based on a screen of at least one object, and identify, based on the first information and the second information matching, the electronic device as other display apparatus. The first information may include information that quantized a screen being displayed by the electronic device and time information at which the screen is displayed, and the second information may include information that quantized a screen of at least one object and time information at which the screen is captured.

For example, the other display apparatus may transmit information that quantized the screen of the content being displayed and time information at which the screen is displayed to the display apparatus 100, and the processor 140 may identify the at least one object from the captured image, quantize a screen of the object that includes the screen from among the at least one object, and identify, based on the quantized information and the received information matching, the object including the screen as the other display apparatus.

The processor 140 may identify, based on the other display apparatus being identified, a content being displayed by the other display apparatus, identify an AR object based on the identified content, and control the display 130 to display the identified AR object based on a position of the other display apparatus.

For example, the processor 140 may identify, based on the content being displayed by the other display apparatus being a baseball match content, bleachers (or stands) and a cheering squad as an AR object. The processor 140 may identify the AR object based on the identified content, and receive the AR object corresponding to the content from the other display apparatus. In a latter case, the other display apparatus may provide information about an image of the AR object, a display position, a display time point, and the like to the display apparatus 100.

The processor 140 may identify at least one from among the position or orientation of the other display apparatus, and control the display 130 to display the AR object based on at least one from among the position or orientation of the other display apparatus.

The information about the AR object may include information about at least one from among a form, position or size of the AR object for each frame, and the processor 140 may control the display 130 to display the AR object differently for each frame based on the information about the AR object. Accordingly, the processor 140 may enhance a user experience by displaying different AR objects according to the frame or changing the form or position of the AR object according to the frame.

The information about the AR object may include first object information about the AR object from a first frame and second object information about the AR object from a second frame which is spaced apart from the first frame by a pre-set frame, and the processor 140 may interpolate the AR object during a frame between the first frame and the second frame based on the first object information and the second object information, and control the display 130 to display the interpolated AR object. Accordingly, there may be an effect of saving storage space because there is no need to store information about the AR object for all frames, and of the user appreciating a more natural change in form or change in position of the AR object.

The display apparatus 100 may further include a communication interface, and the processor 140 may receive information about the AR object from a server through the communication interface, and store the received information about the AR object in the memory 120.

Alternatively, the processor 140 may control the communication interface to transmit information about at least one object to the server, and receive the information about the AR object corresponding to the at least one object from the server through the communication interface A function associated with an artificial intelligence according to the disclosure may be operated through the processor 140 and the memory 120.

The processor 140 may be configured of one or a plurality of processors. The one or plurality of processors may be a generic-purpose processor such as a CPU, an AP, and a DSP, a graphics dedicated processor such as a graphics processing unit (GPU) or a vision processing unit (VPU), or an artificial intelligence dedicated processor such as a neural processing unit (NPU).

The one or plurality of processors may control so as to process input data according to a pre-defined operation rule or an artificial intelligence model stored in the memory 120. Alternatively, if the one or plurality of processors is the artificial intelligence dedicated processor, the artificial intelligence dedicated processor may be designed to a hardware structure specializing in a processing of a specific artificial intelligence model. The pre-defined operation rule or the artificial intelligence model is characterized by being created through learning.

The being created through learning referred herein refers to the pre-defined operation rule or artificial intelligence model set to perform a desired feature (or, purpose) being created as a basic artificial intelligence model is trained by a learning algorithm using a plurality of learning data. The learning may be carried out in a machine itself in which the artificial intelligence according to the disclosure is performed, or carried out through a separate server and/or system. Examples of the learning algorithm may include a supervised learning, a unsupervised learning, a semi-supervised learning, or a reinforcement learning, but is not limited to the above-described examples.

The artificial intelligence model may be configured of a plurality of neural network layers. Each of the neural network layers may include a plurality of weight values, and perform a neural network processing through processing between a processing result of a previous layer and the plurality of weight values. The plurality of weight values comprised by the plurality of neural network layers may be optimized by a learning result of the artificial intelligence model. For example, the plurality of weight values may be updated for a loss value or a cost value obtained by the artificial intelligence model during the learning process to be reduced or minimized.

An artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Generative Adversarial Network (GAN), a Deep-Q Networks, or the like, but are not limited thereto.

Figure 3:
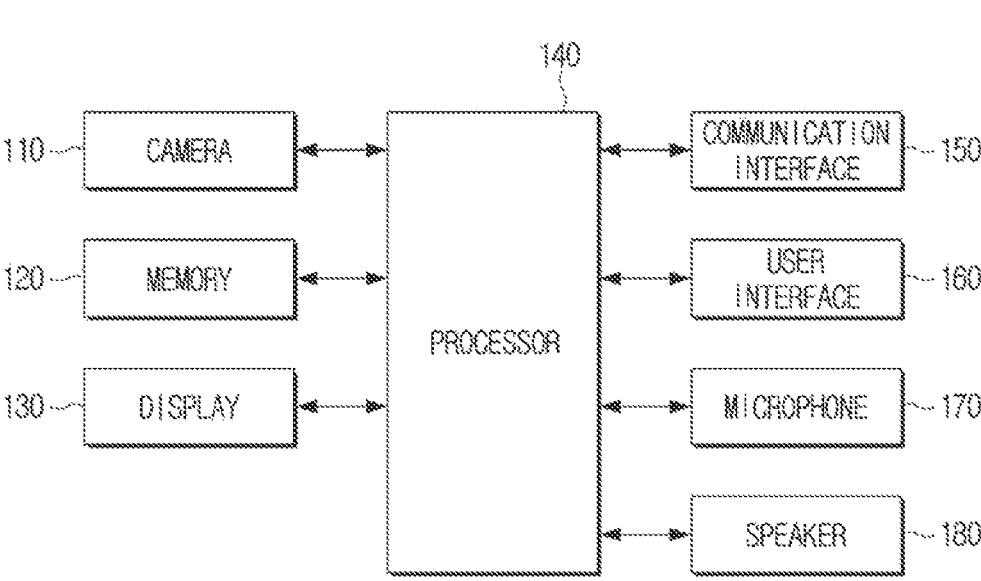
FIG. 3 is a block diagram illustrating a detailed configuration of a display apparatus, according to one or more embodiments.

FIG. 3 is a block diagram illustrating a detailed configuration of the display apparatus 100 according to one or more embodiments.

The display apparatus 100 may include the camera 110, the memory 120, the display 130, and the processor 140. In addition, referring to FIG. 3, the display apparatus 100 may further include a communication interface 150, a user interface 160, a microphone 170, and a speaker 180. Detailed descriptions of parts that overlap with the elements shown in FIG. 2 from among the elements shown in FIG. 3 will be omitted.

The communication interface 150 may be a configuration that performs communication with an external device of various types according to communication methods of various types. For example, the display apparatus 100 may perform communication with a server or a user terminal through the communication interface 150.

The communication interface 150 may include a Wi-Fi module, a Bluetooth module, an infrared communication module, a wireless communication module, and the like. Each communication module may be implemented in at least one hardware chip form.

The Wi-Fi module and the Bluetooth module may perform communication in a Wi-Fi method and a Bluetooth method, respectively. When using the Wi-Fi module or the Bluetooth module, various connection information such as a service set identifier (SSID) and a session key may first be transmitted and received, and after communicatively connecting using the same, various information may be transmitted and received. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

Alternatively, the communication interface 150 may include wired communication interfaces such as, for example, and without limitation, HDMI, DP, Thunderbolt, USB, RGB, D-SUB, DVI, and the like.

In addition thereto, the communication interface 150 may include at least one from among the wired communication modules that perform communication using a local area network (LAN) module, an Ethernet module, or a pair cable, a coaxial cable, an optical fiber cable, or the like.

The user interface 160 may be implemented as a button, a touch pad, a mouse, a keyboard, and the like, or implemented also as a touch screen capable of performing a display function and an operation input function together therewith. The button may be a button of various types such as a mechanical button, a touch pad, or a wheel which is formed at a random area at a front surface part or a side surface part, a rear surface part, or the like of an exterior of a main body of the display apparatus 100.

The microphone 170 may be a configuration for receiving sound and converting to an audio signal. The microphone 170 may be electrically connected with the processor 140, and may receive sound by the control of the processor 140.

For example, the microphone 170 may be formed as an integrated-type integrated to an upper side or a front surface direction, a side surface direction or the like of the display apparatus 100. Alternatively, the microphone 170 may be provided in a separate remote controller, or the like from the display apparatus 100. The remote controller may receive sound through the microphone 170, and provide the received sound to the display apparatus 100.

The microphone 170 may include various configurations such as a microphone that collects sound of an analog form, an amplifier circuit that amplifies the collected sound, an A/D converter circuit that samples the amplified sound and converts to a digital signal, a filter circuit that removes noise components from the converted digital signal, and the like.

The microphone 170 may be implemented in a form of a sound sensor, and may be any method so long as it is a configuration that can collect sound.

The speaker 180 may be an element that outputs not only various audio data processed from the processor 140, but also various notification sounds, voice messages, or the like.

The display apparatus 100 as described above may adaptively display an AR object in a real environment based on semantic information about the AR object. In addition, the display apparatus 100 may identify other display apparatuses without interruption to viewing by the user, display an AR object associated with the content being displayed from the other display apparatus, and thereby user convenience may be enhanced.

An operation of the display apparatus 100 will be described in greater detail below through FIG. 4 to FIG. 15. In FIG. 4 to FIG. 15, individual embodiments will be described for convenience of description. However, the individual embodiments of FIG. 4 to FIG. 15 may be realized in a combined state at any time.

Figure 4:
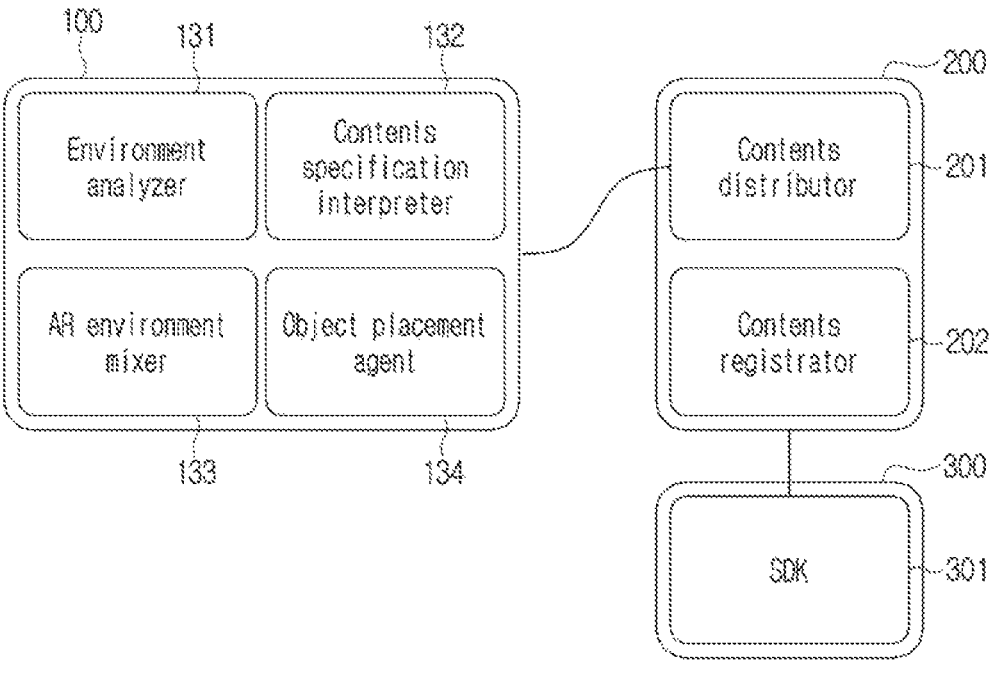
FIG. 4 is a diagram illustrating a module that performs each operation, according to one or more embodiments.

FIG. 4 is a diagram illustrating a module that performs each operation, according to one or more embodiments. In FIG. 4, each module may be data stored in the memory 120, and the processor 140 may be described as performing an operation based on data stored in the memory. However, the embodiment is not limited thereto, and each module of FIG. 4 may be realized as individual hardware.

The display apparatus 100 as shown in FIG. 4 may first receive an AR object from a server 200. The server 200 may receive an AR content from a subject 300 generating the AR content through a development tool.

The memory 120 of the display apparatus 100 may be stored with an environment analyzer 131, a contents specification interpreter 132, an AR environment mixer 133, and an object placement agent 134.

The environment analyzer 131 may be a module that performs specification of a real environment, and for example, the environment analyzer 131 may identify at least one object from the real environment, and obtain spatial information by identifying the position, distance, orientation, and the like of the at least one object.

The contents specification interpreter 132 may be a module that analyzes the specification obtained from the environment analyzer 131.

The AR environment mixer 133 may be a module that fuses the real environment and the AR object by fusing information obtained through the environment analyzer 131 and the contents specification interpreter 132.

The object placement agent 134 may be a module that displays a fused environment through the AR environment mixer 133.

The server 200 may include an AR content registering module (a contents registrator 202) that stores the AR content received from an AR content distributing module (a contents distributor 201) that provides AR content to the display apparatus 100 and the subject 300 generating the AR content.

The subject 300 that generates the AR content may generate the AR content through a pre-defined SDK 301.

Figure 5:
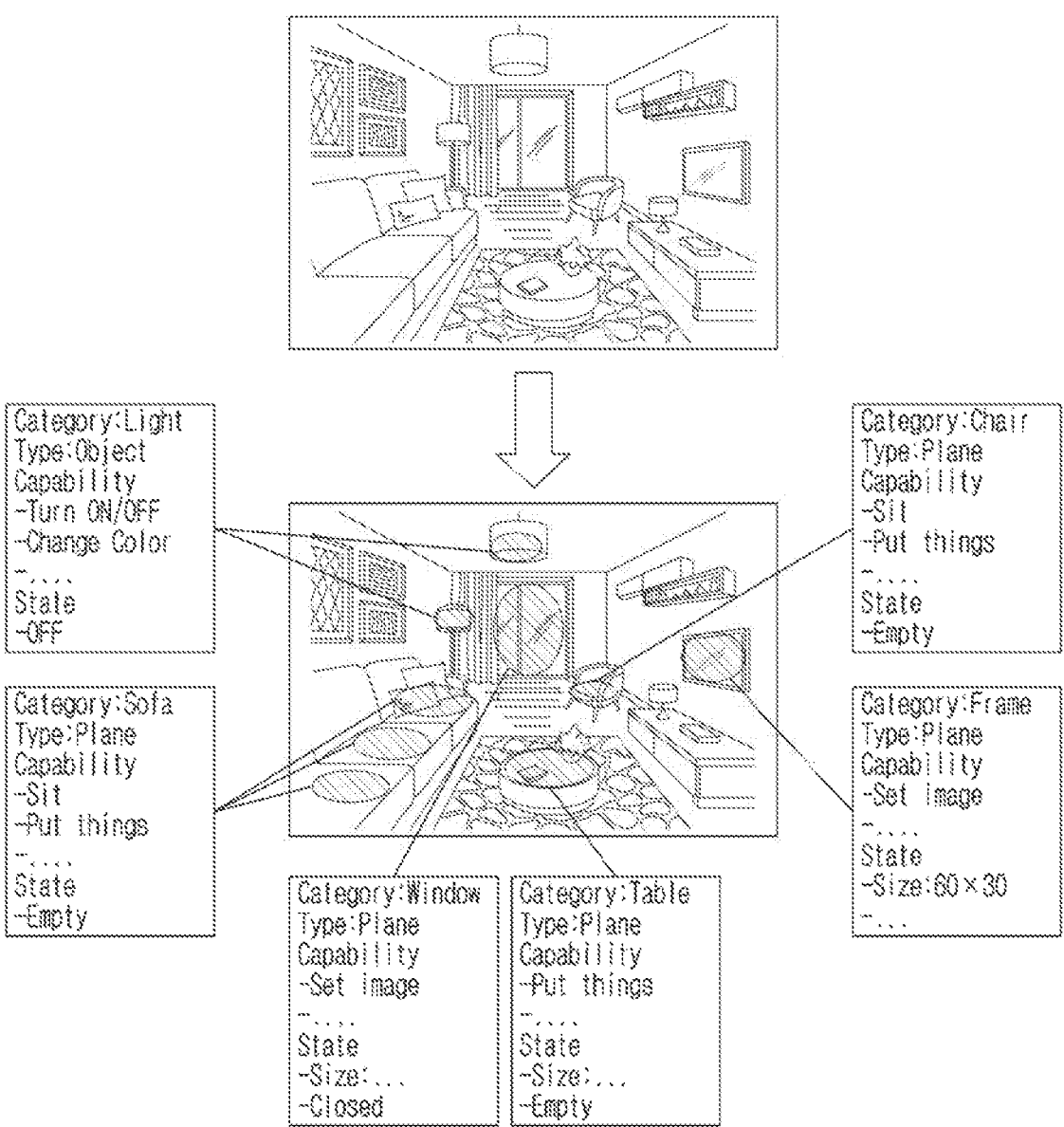
FIG. 5 and FIG. 6 are diagrams illustrating a specification of a real environment, according to one or more embodiments.
Figure 6:
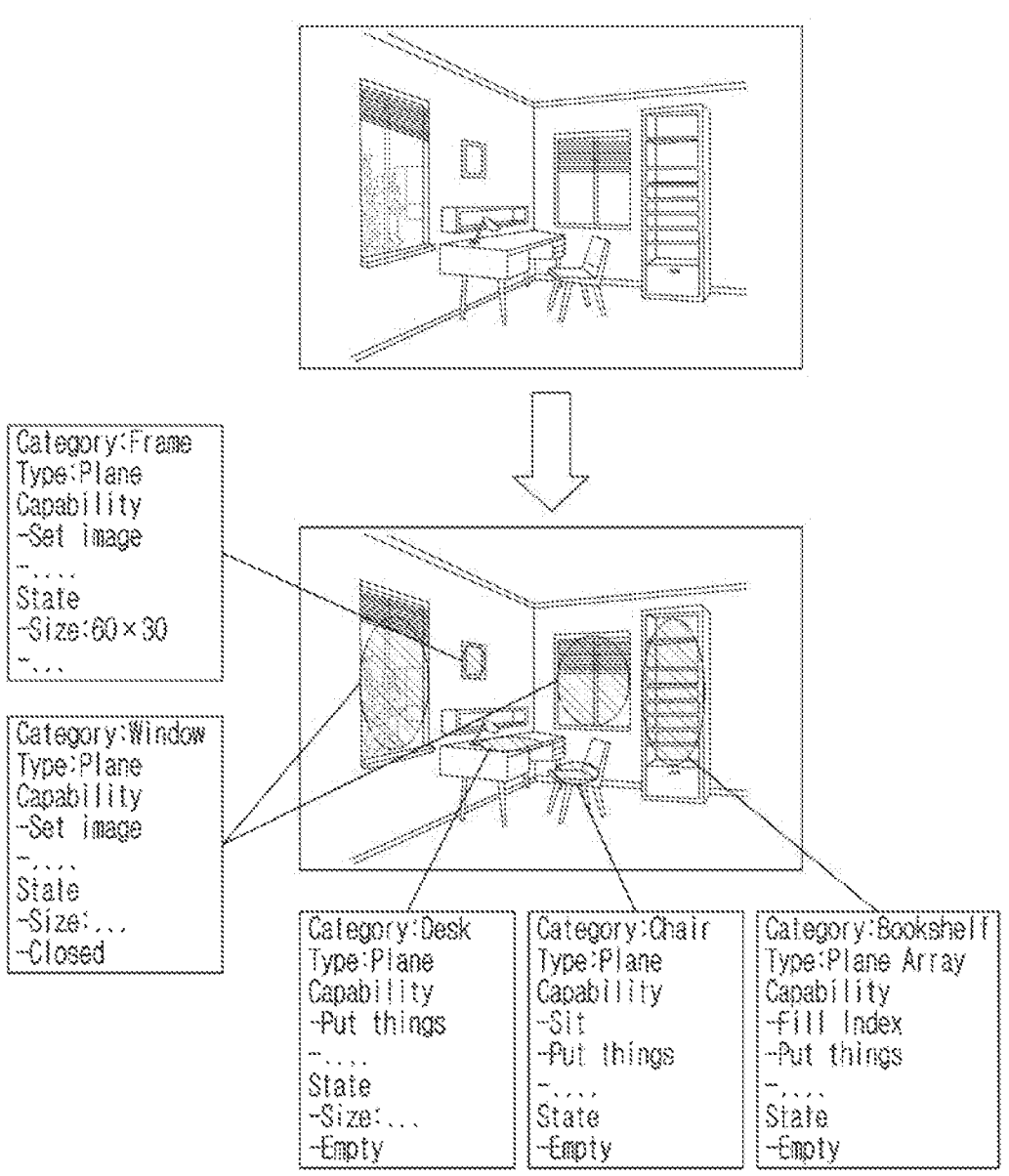

FIG. 5 and FIG. 6 are diagrams illustrating a specification of a real environment, according to one or more embodiments.

According to one or more embodiments, a first real environment is as shown in FIG. 5, and a second real environment is as shown in FIG. 6.

The processor 140 may capture the first real environment and obtain an image as in an upper end of FIG. 5, and identify at least one object from the obtained image.

For example, the processor 140 may identify a light, a sofa, a window, a table, a chair, a frame, and the like, from the image as in the upper end of FIG. 5.

In addition, the processor 140 may obtain information about each of the objects based on types of each of the objects. For example, the processor 140 may identify at least one from among a category, an interacting element, a state, or a size of each of the objects. For example, the processor 140 may obtain, based on the chair being identified as in FIG. 5, information that the type is a plane, a capability is to sit, put things, and the like, and the state is empty.

The processor 140 may perform the same work for even the second real environment as shown in FIG. 6.

Figure 7:
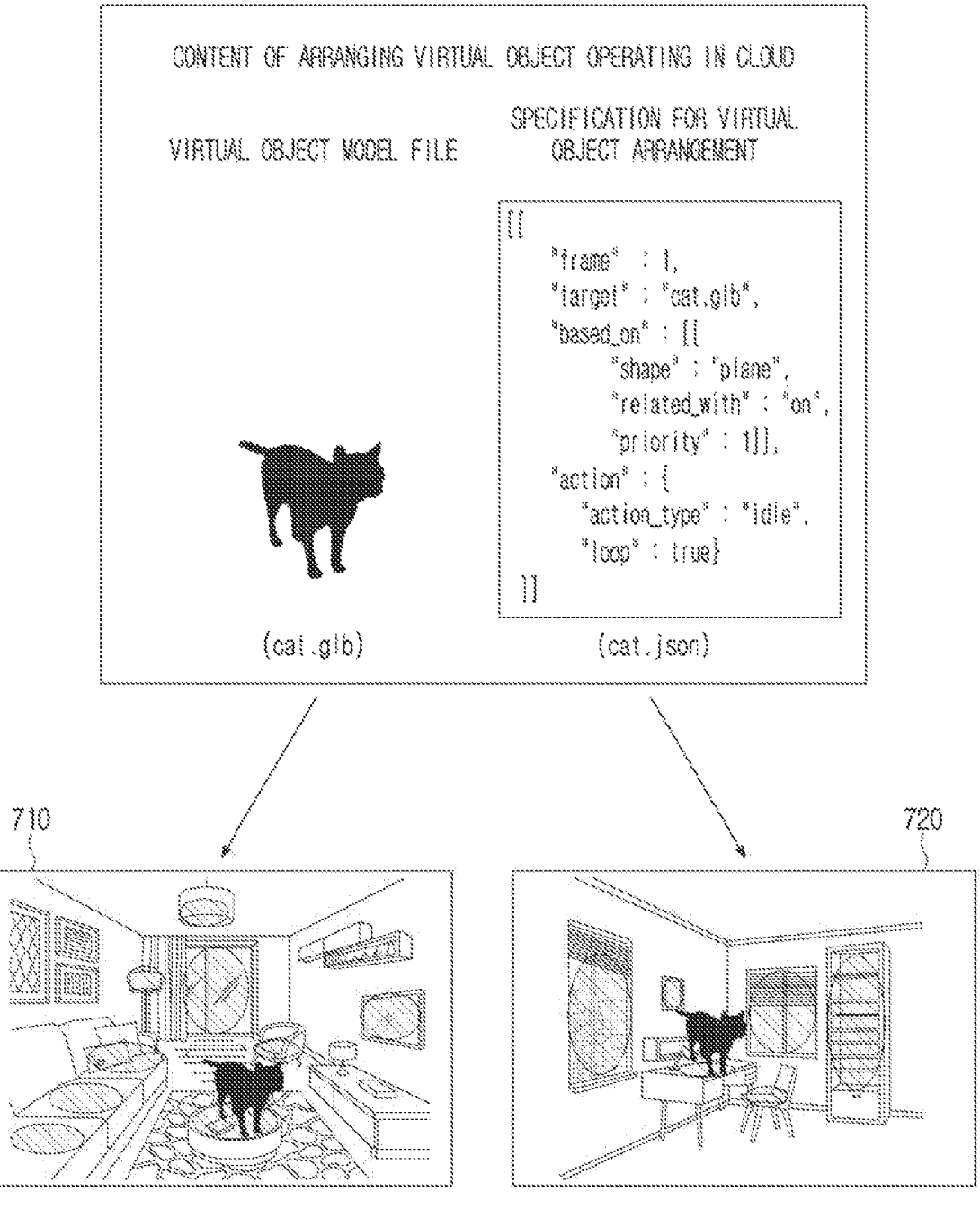
FIG. 7 is a diagram illustrating a specification of an AR object, according to one or more embodiments.

FIG. 7 is a diagram illustrating a specification of an AR object, according to one or more embodiments.

For example, the information about the AR object (e.g., specification of the AR object) may include, as shown in an upper end of FIG. 7, a model file in a cat form, information about a position to which the model file is to be arranged, information about how the model file is to move, and the like. For example, the specification of the upper end of FIG. 7 describes an operation of positioning a model file in the first frame at a place with a function of placing an object on top thereof from among the plane types and being in an idle state.

If the specification of the upper end of FIG. 7 is applied to FIG. 5, an AR object in cat form may be displayed over the table as in 710, and if the specification of the upper end of FIG. 7 is applied to FIG. 6, an AR object in cat form may be displayed over a desk as in 720.

As described above, because the processor 140 displays the AR object based the specification of the AR object and the specification of the real environment, the AR object may be adaptively displayed in the real environment.

Figure 8:
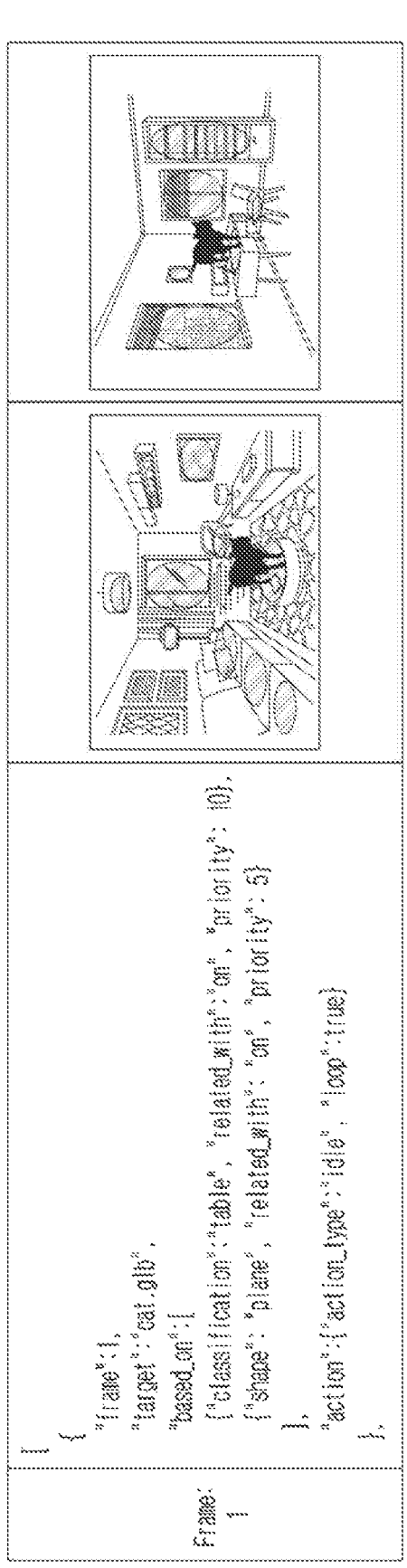
FIG. 8 to FIG. 10 are diagrams illustrating specifications for each frame, according to one or more embodiments.
Figure 9:
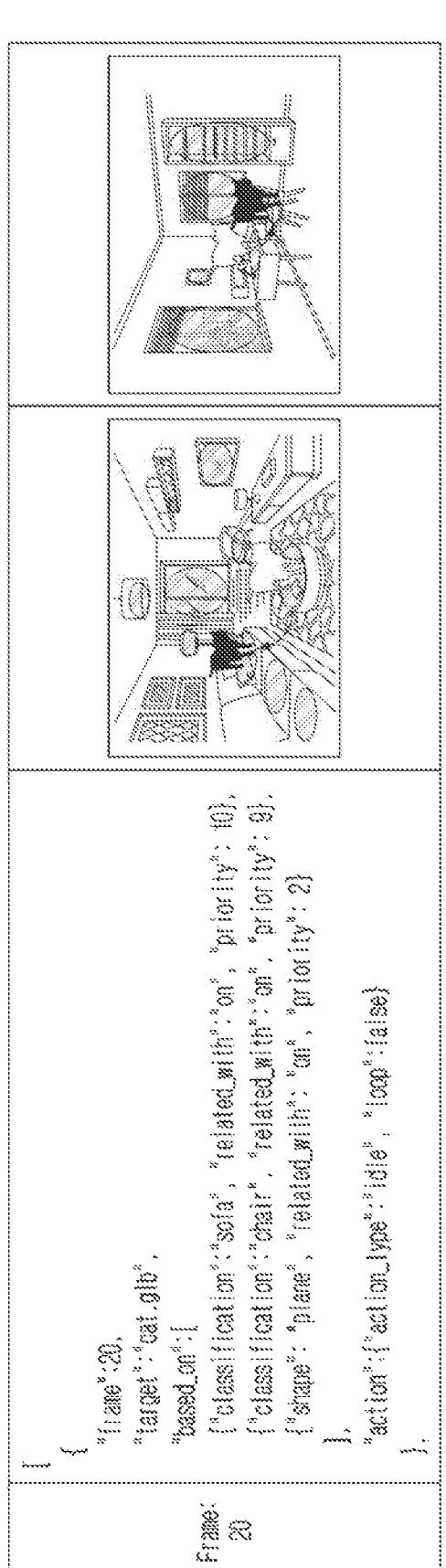
Figure 10:
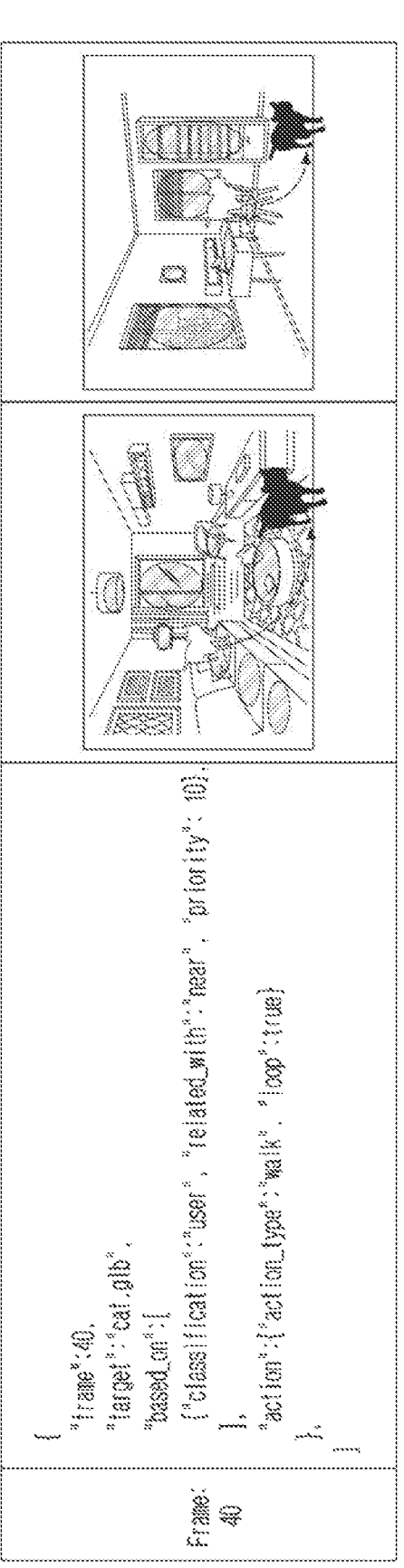

FIG. 8 to FIG. 10 are diagrams illustrating specifications for each frame, according to one or more embodiments.

In FIG. 7, although only the specification in the first frame has been described, different specifications may be used in a plurality of frames, as in, for example, FIG. 8 to FIG.

Because FIG. 8 is same as frame 1 of FIG. 7, redundant descriptions thereof will be omitted.

FIG. 9 describes an AR object in cat form being displayed on the sofa or the chair in frame 20. FIG. 10 describes an AR object in cat form being displayed near the user in frame 40.

The processor 140 may interpolate frame 1 and frame 20 and identify the position of the AR object in cat form from frames 2 to 19, and interpolate frame 20 and frame 40 and identify the position of the AR object in cat form from frames 21 to 39.

FIG. 11 and FIG. 12 are diagrams illustrating a method of specifying for each frame, according to one or more embodiments.

FIG. 11 shows a specification method of how an AR object is to be represented in each key frame.

Each key frame specification may describe a frame number and an a target AR object based on an analysis result of a real environment, and describe a selection method of the target object and a motion of the AR object.

For example, the processor 140 may describe of selecting the target object and how to position the target object based on a shape 1110, a classification 1120, and a capability 1130 of the at least one object. In addition, the processor 140 may set a priority order in the selection of the target object because the presence of the target object may vary according to the real environment The motion may be a specification of what kind of motion to have at a selected position.

Based on the method as described above, an actual specification is shown in FIG. 12.

A first specification 1210 describes, in frame 1, of placing a "cat.glb" AR object over a table if there is an actual object classified as the table, and placing the "cat.glb" AR object on a plane if there is no object, and then showing a basic motion repeatedly.

A second specification 1220 describes, in frame 20, of positioning the "cat.glb" AR object over the actual object classified as the sofa, positioning over the actual object classified as the chair if the object classified as the sofa is not present, positioning over a plane if the object classified as the chair is not present, and showing how to walk.

A third specification 1230 describes, in frame 40, of the "cat.glb" AR object coming near the user and repeatedly showing the walking motion.

The processor 140 may display, based on a specification of the key frame described above, the AR object by interpolating a content of frames between key frames.

Figure 13:
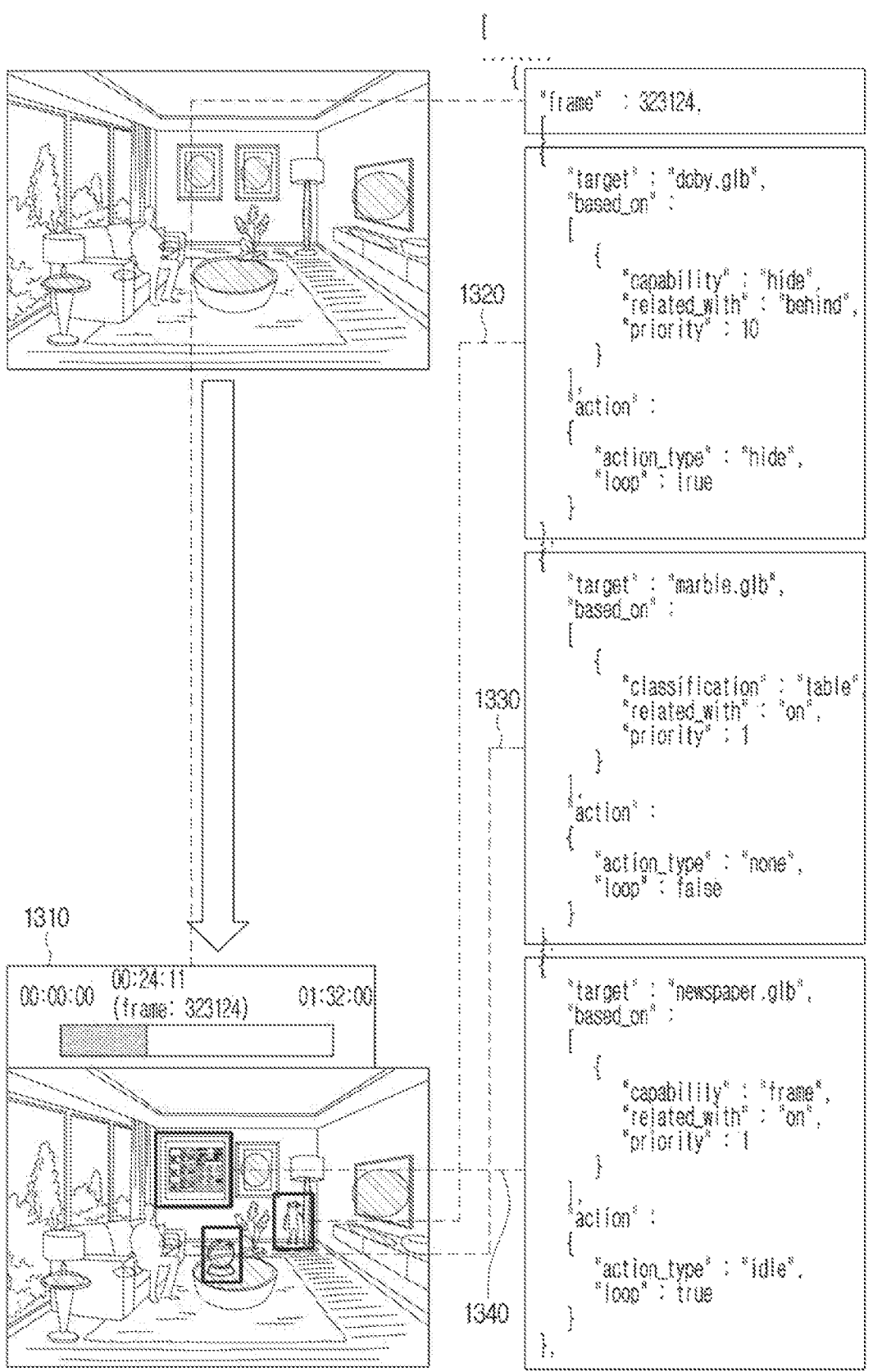
FIG. 13 is a diagram illustrating an operation of displaying a plurality of AR objects, according to one or more embodiments.

FIG. 13 is a diagram illustrating an operation of displaying a plurality of AR objects according to one or more embodiments.

First, the specifications shown at a right side of FIG. 13 only represents an instance of reaching a specific key frame 1310 from among the specifications for each key frame. Accordingly, the processor 140 may control, as in a left lower end, the display 130 to display three AR objects 1320, 1330, and 1340 in the specific key frame 1310. A first AR object 1320 may be an object in motion, and the remaining objects 1330 and 1340 may be objects in a still state.

Figure 14:
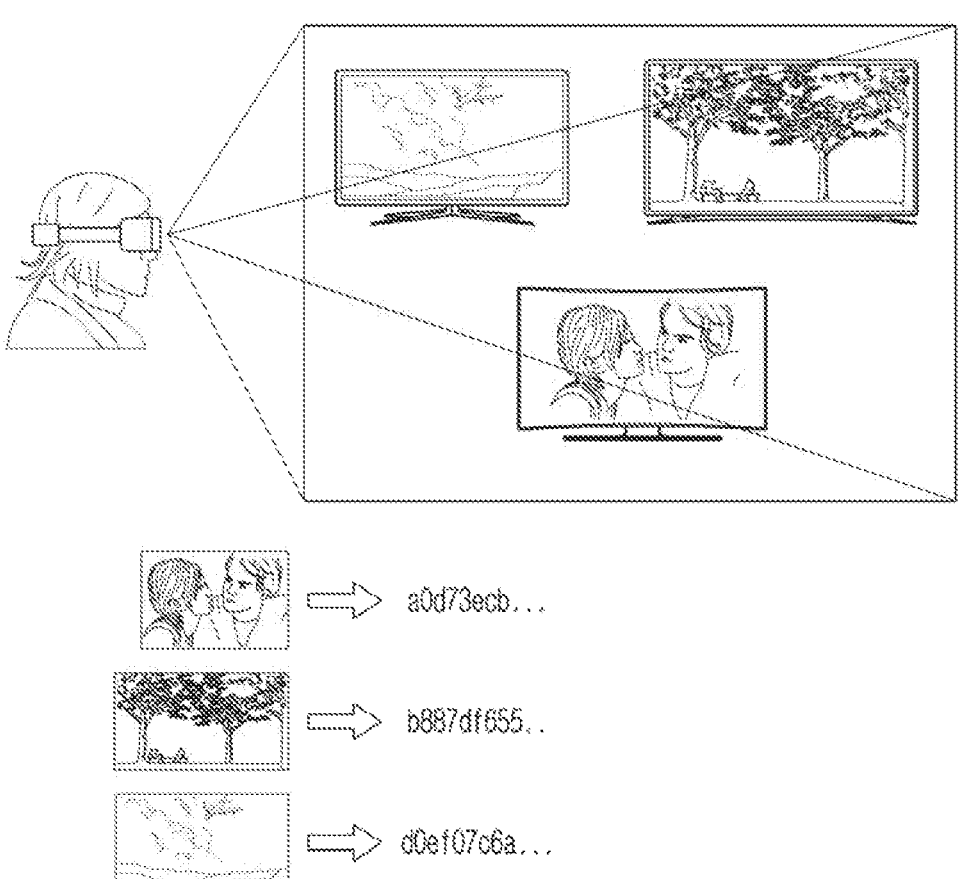
FIG. 14 is a diagram illustrating an identification method of other display apparatuses, according to one or more embodiments.

FIG. 14 is a diagram illustrating an identification method of other display apparatuses according to one or more embodiments.

The processor 140 may receive first information from an electronic device, obtain second information based on a screen of at least one object identified from a captured image, and identify, based on the first information and the second information matching, the electronic device as the other display apparatus. The first information may include information that quantized a screen being displayed by the electronic device and time information at which the screen is displayed, and the second information may include information that quantized the screen of at least one object and time information at which the screen is captured.

For example, the processor 140 may quantize the screens of each of the other display apparatuses from an image that captured a plurality of other display apparatuses as shown in FIG. 14. For example, the processor 140 may obtain quantized information such as a0d73ecb . . . from a first screen. The processor 140 may compare the quantized information with information received from the plurality of other display apparatuses, and identify positions of the plurality of other display apparatuses based on whether there is information that matches with the obtained quantized information. For example, the processor 140 may obtain spatial information including at least one object through the depth camera, and match the object included in the image with a real other display apparatus according to whether it matches the quantized information. Through the method described above, the processor 140 may classify and identify the plurality of other display apparatuses. In addition, there is an advantage of there being no viewing interruption of the user because of having to use the quantized information.

Figure 15:
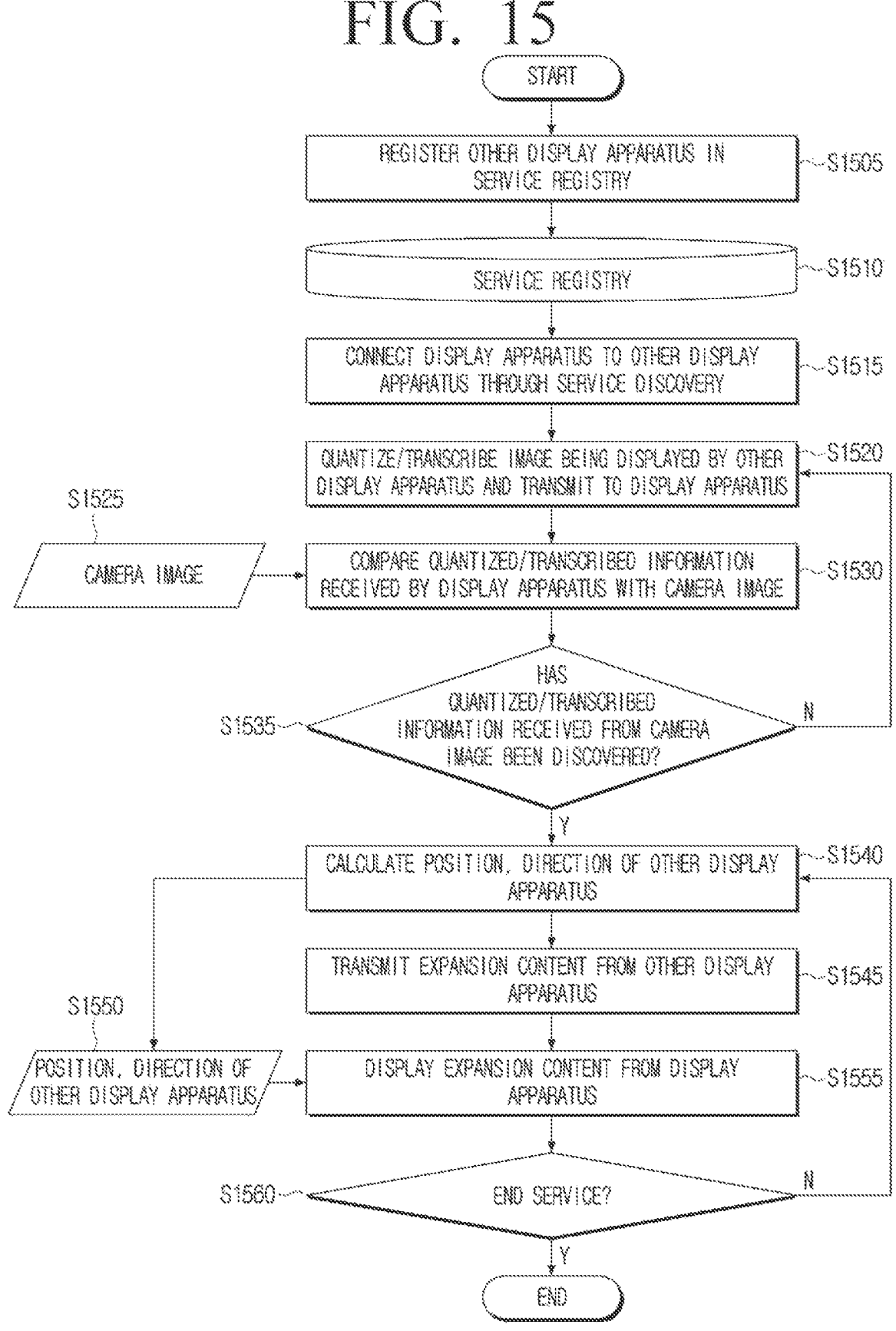
FIG. 15 is a flowchart illustrating an interlinked operation with other display apparatuses, according to one or more embodiments.

FIG. 15 is a flowchart illustrating an interlinked operation with other display apparatuses according to one or more embodiments.

First, the other display apparatus may register with a service registry on a wired or wireless network that uses protocols such as Wi-Fi or Bluetooth (S1505). The other display apparatus may be registered in the service registry and maintain a searchable state (S1510). The display apparatus 100 may connect to the other display apparatus through the service discovery (S1515).

The other display apparatus may quantize/transcribe the image being displayed and transmit to the display apparatus 100 (S1520). For example, the other display apparatus may use technology such as Perceptual Hash, obtain transcribed information classifying the image, and transmit the obtained information to the display apparatus 100. FIG. 15 describes of one operation of the other display apparatus for convenience of description, but it may be operations of the plurality of other display apparatuses. In addition, the other display apparatus may transmit additional information such as a screen size to the display apparatus 100.

The display apparatus 100 may capture the other display apparatus desiring to display the AR object through the camera and obtain a camera image (S1525).

The display apparatus 100 may compare the received quantized/transcribed information with the camera image (S1530). The display apparatus 100 may calculate, based on the received quantized/transcribed information being discovered in the camera image (S1535-Y), the position, direction, and the like of the other display apparatus (S1540), and return, based on the received quantized/transcribed information not being discovered in the camera image (S1535-N), to step S1520. The display apparatus 100 may partially crop the camera image, quantize/transcribe in a same method as the other display apparatus after rotating the cropped image in an arbitrary direction, and compare the above with the quantized/transcribed information received from the other display apparatus. Then, the display apparatus 100 may calculate the position, direction, and the like of the other display apparatus based on the screen size received from the other display apparatus.

The other display apparatus may transmit an expansion content including the AR object to the display apparatus 100 (S1545), and the display apparatus 100 may display the expansion content (S1555) based on the position, direction, and the like of the other display apparatus (S1550). For example, the display apparatus may display positions of each player and a ball during a football (or soccer) match broadcast in a stadium drawn in 3D in front of the other display apparatus.

The display apparatus 100 may determine whether to end service (S1560), and return to step S1540 if the service is not ended.

Through the steps described above, the position and orientation of the plurality of other display apparatuses may be identified without interruption to an immersive experience by the user. In addition, identification may be possible without adding separate hardware, and because screen data as a whole is not transmitted, there is an effect of reducing transmission data size.

Figure 16:
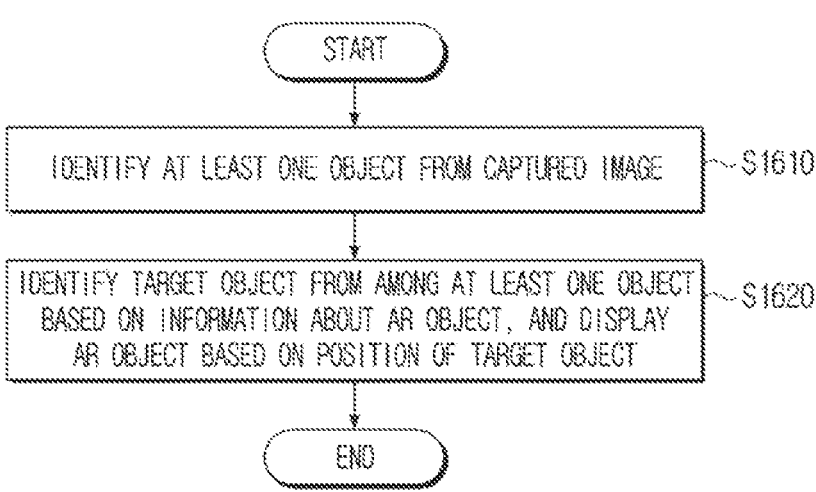
FIG. 16 is a flowchart illustrating a control method of a display apparatus, according to one or more embodiments.

FIG. 16 is a flowchart illustrating a control method of a display apparatus, according to one or more embodiments.

First, at least one object may be identified from the captured image (S1610). Then, the target object from among the at least one object may be identified based on information about the AR object, and the AR object may be displayed based on the position of the target object (S1620).

The information about the AR object may include identification information of the target object and arrangement information showing the arranged state of the AR object with respect to the target object, and the displaying (S1620) may include identifying the target object from among the at least one object based on the identification information and arranging the AR object with respect to the target object based on the arrangement information.

Further, the identification information may include information about at least one from among a form or color of the target object, and the arrangement information may include at least one from among a relative position of the AR object with respect to the target object or an AR object displaying method.

Obtaining spatial information including information about the at least one object and updating the spatial information to include the AR object based on the position of the target object may be further included.

Displaying, based on the target object being re-identified after not being able to identify the target object from the captured image because the orientation of the display apparatus is changed, the AR object based on the position of the target object based on the updated spatial information may be further included.

Receiving first information from the electronic device, obtaining second information based on a screen of at least one object, and identifying, based on the first information and the second information matching, the electronic device as the other display apparatus may be further included, and the first information may include information that quantized a screen being displayed by the electronic device and time information at which the screen is displayed, and the second information may include information that quantized the screen of at least one object and time information at which the screen is captured.

Identifying, based on the other display apparatus being identified, the content being displayed by the other display apparatus and identifying the AR object based on the identified content may be further included, and the displaying (S1620) may include displaying the identified AR object based on the position of the other display apparatus.

Then, identifying at least one from among the position or orientation of the other display apparatus may be further included, and the displaying may include displaying the AR object based on at least one from among the position or orientation of the display apparatus.

The information about the AR object may include information about at least one from among the form, position, or size of the AR object for each frame, and the displaying (S1620) may include displaying the AR object for each frame differently based on the information about the AR object.

In addition, the information about the AR object may include first object information about the AR object from the first frame and second object information about the AR object from the second frame which is spaced apart from the first frame by a pre-set frame, and the displaying (S1620) may include interpolating the AR object during a frame between the first frame and the second frame based on the first object information and the second object information, and displaying the interpolated AR object.

According to the various embodiments of the disclosure as described above, the display apparatus may adaptively display the AR object in a real environment based on semantic information about the AR object.

In addition, the display apparatus may identify other display apparatuses without interruption to viewing by the user, display the AR object associated with the content being displayed from the other display apparatus, and thereby user convenience may be enhanced.

The various embodiments described above may be implemented with software which includes instructions stored in a machine-readable storage medium (e.g., computer). The machine may call an instruction stored in the storage medium, and as a device operable according to the called instruction, may include an electronic device (e.g., electronic device (A)) according to the above-mentioned embodiments. Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in In addition, according to one or more embodiments, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, according to one or more embodiments of the disclosure, the various embodiments described above may be implemented in a recordable medium which is readable by a computer or a device similar to the computer using software, hardware, or the combination of software and hardware. In some cases, embodiments described herein may be implemented by the processor on its own. According to a software implementation, embodiments such as the procedures and functions described herein may be implemented as separate software. Each software may perform one or more functions and operations described herein.

The computer instructions for performing processing operations in the device according to the various embodiments described above may be stored in a non-transitory computer-readable medium. The computer instructions stored in this non-transitory computer-readable medium may cause a specific device to perform a processing operation of the device according to the above-described various embodiments when executed by a processor of the specific device. The non-transitory computer-readable medium may refer to a medium that stores data semi-permanently rather than storing data for a very short time, such as a register, a cache, a memory, or the like, and is readable by a device. Specific examples of the non-transitory computer-readable medium may include, for example, and without limitation, a compact disc (CD), a digital versatile disc (DVD), a hard disc, a Blu-ray disc, a USB, a memory card, a ROM, and the like.

In addition, each element (e.g., a module or a program) according to the various embodiments described above may be formed of a single entity or a plurality of entities, and some sub-elements of the abovementioned sub-elements may be omitted or other sub-elements may be further included in the various embodiments. Alternatively or additionally, some elements (e.g., modules or programs) may be integrated into one entity and perform the same or similar functions performed by each of the corresponding elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

While the disclosure has been illustrated and described with reference to various embodiments thereof, it will be understood that the various embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus, comprising:
   a camera;

a memory configured to store information about an augmented reality (AR) object;

a display; and at least one processor connected with the camera, the memory, and the display, the at least one processor being configured to control the display apparatus to:

identify at least one object from an image captured through the camera, identify a target object from among the at least one object based on information about the AR object, and control the display to display the AR object based on a position of the target object, wherein the at least one processor is further configured to:

receive first information from an electronic device through a communication interface, the first information comprising information quantizing a screen being displayed by the electronic device and time information at which the screen is displayed, obtain second information based on the screen of the at least one object, the second information comprising information quantizing the screen of the at least one object and time information at which the screen is captured, and based on the first information and the second information matching, identify the electronic device as other display apparatus.

2. The display apparatus of claim 1, wherein the information about the AR object comprises identification information about the target object and arrangement information showing an arranged state of the AR object with respect to the target object, and wherein the at least one processor is further configured to:

identify the target object from among the at least one object based on the identification information, and perform an operation of arranging the AR object with respect to the target object based on the arrangement information.

3. The display apparatus of claim 2, wherein the identification information comprises information about at least one from among a form or a color of the target object, and the arrangement information comprises at least one from among a relative position of the AR object with respect to the target object or a displaying method of the AR object.

4. The display apparatus of claim 1, wherein the at least one processor is further configured to:

based on the other display apparatus being identified, identify a content being displayed by the other display apparatus, identify the AR object based on the identified content, and control the display to display the identified AR object based on a position of the other display apparatus.

5. The display apparatus of claim 4, wherein the at least one processor is further configured to:

identify at least one from among the position or orientation of the other display apparatus, and control the display to display the AR object based on at least one from among the position or the orientation of the other display apparatus.

6. The display apparatus of claim 1, wherein the information about the AR object comprises information about at least one from among a form, a position, or a size of the AR object for each frame, and wherein the at least one processor is further configured to control the display to display the AR object for each frame differently based on the information about the AR object.

7. The display apparatus of claim 1, wherein the information about the AR object comprises first object information about the AR object from a first frame and second object information about the AR object from a second frame spaced apart from the first frame by a pre-set frame, and wherein the at least one processor is further configured to:

interpolate the AR object during a frame between the first frame and the second frame based on the first object information and the second object information, and control the display to display the interpolated AR object.

8. The display apparatus of claim 1, further comprising:

the communication interface, wherein the at least one processor is further configured to:

receive the information about the AR object from a server through the communication interface, and store the received information about the AR object in the memory.

9. The display apparatus of claim 8, wherein the at least one processor is further configured to:

control the communication interface to transmit information about the at least one object to the server, and receive information about the AR object corresponding to the at least one object from the server through the communication interface.

10. A control method of a display apparatus, the control method comprising:

identifying at least one object from a captured image;

identifying a target object from among the at least one object based on information about an augmented reality (AR) object, and displaying the AR object based on a position of the target object, wherein the control method further comprises:

receiving first information from an electronic device through a communication interface, the first information comprising information quantizing a screen being displayed by the electronic device and time information at which the screen is displayed, obtaining second information based on the screen of the at least one object, the second information comprising information quantizing the screen of the at least one object and time information at which the screen is captured, and based on the first information and the second information matching, identifying the electronic device as other display apparatus.

11. The control method of claim 10, wherein the information about the AR object comprises identification information about the target object and arrangement information showing an arranged state of the AR object with respect to the target object, and wherein the displaying the AR object comprises identifying the target object from among the at least one object based on the identification information, and performing an operation of arranging the AR object with respect to the target object based on the arrangement information.

12. The control method of claim 11, wherein the identification information comprises information about at least one from among a form or color of the target object, and wherein the arrangement information comprises at least one from among a relative position of the AR object or a displaying method of the AR object with respect to the target object.

13. A display apparatus, comprising:

a memory configured to store instructions;

at least one processor configured to execute the stored instructions to:

identify at least one object from an image captured through a camera, identify a target object from among the at least one object based on information about an augmented reality (AR) object, wherein the information about the AR object comprises identification information about the target object and arrangement information showing an arranged state of the AR object with respect to the target object, and control a display to display the AR object based on a position of the target object, wherein the at least one processor is further configured to:

receive first information from an electronic device through a communication interface, the first information comprising information quantizing a screen being displayed by the electronic device and time information at which the screen is displayed, obtain second information based on the screen of the at least one object, the second information comprising information quantizing the screen of the at least one object and time information at which the screen is captured, and based on the first information and the second information matching, identify the electronic device as other display apparatus.

14. The display apparatus of claim 13, wherein the at least one processor is further configured to arrange the AR object with respect to the target object based on the arrangement information.

15. The display apparatus of claim 14, wherein the identification information comprises information about at least one from among a form or a color of the target object, and the arrangement information comprises at least one from among a relative position of the AR object with respect to the target object or a displaying method of the AR object.

\* \* \* \* \*